June 14, 1955 H. W. STETTNER 2,710,758

MECHANIC'S CREEPER WITH ADJUSTABLE HEADREST

Filed March 24, 1953

*INVENTOR:*
HUGO W. STETTNER
BY

ATT'YS

United States Patent Office 2,710,758
Patented June 14, 1955

2,710,758
MECHANIC'S CREEPER WITH ADJUSTABLE HEADREST

Hugo W. Stettner, Chicago, Ill.

Application March 24, 1953, Serial No. 344,425

3 Claims. (Cl. 280—32.6)

The main objects of this invention are to provide an improved and simplified form of automobile repairman's floor creeper; and to provide improved means for supporting the back rest of such creeper in various positions of adjustment.

A specific embodiment of this invention is shown in the accompanying drawing, in which.

Figure 1:
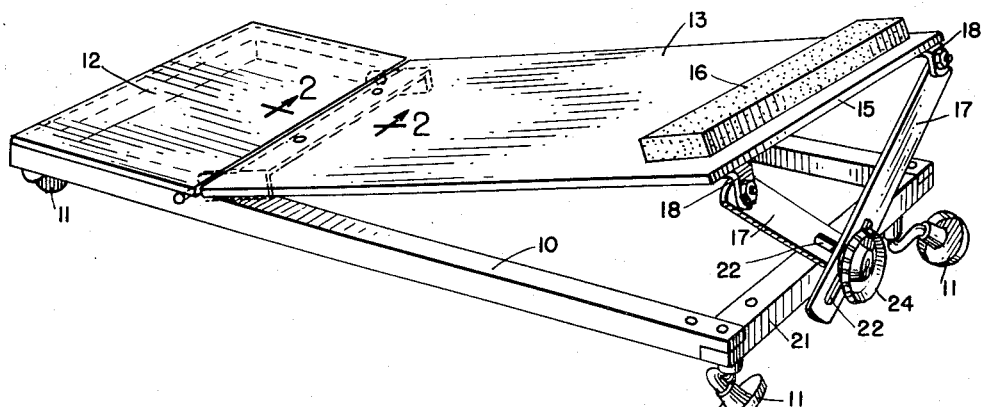
Figure 1 is a perspective view of a floor creeper constructed according to this invention.
Figure 2:
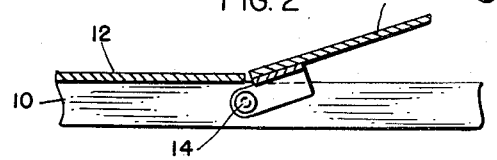
Fig. 2 is a detail of the hinge joint between the seat and back rest portions of the platform of the creeper.

In the form shown in the drawings, the creeper comprises an elongated flat rectangular frame 10 mounted upon caster wheels 11 so as to lie close to and substantially parallel with the floor on which the creeper rests.

The frame 10 is covered by a platform comprising a fixed seat member 12 and an adjustable back rest member 13. The back rest member 13 is hinged to the frame 10 at its lower end on a rod 14 for tilting about a transverse axis so that its upper, or head end 15, can be raised and lowered for the operator's convenience. The platform member 13 may be provided with the usual head cushion 16. In order to secure the back rest at various elevated positions, a pair of brace bars 17 are pivoted to lugs 18 fastened to the head end of the member 13 and spaced widely apart toward opposite sides of said member. These braces are loosely held by the pivot bolts 19, so that the braces 17 may not only rotate in the common plane defined thereby in the crossed position in which they are shown but may also yield in a fore-and-aft direction enough to avoid resistance to the tilting of the back rest 13.

The brace bars 17 are loosely slotted to receive a stud 20 on the end member 21 of the frame 10 in position to engage the bars 17 in the manner shown. The slots 22 in the bars 17 have a width corresponding to the diameter of the stud 20 and a length sufficient to allow the brace bars 17 to slide on the stud while swinging from the extreme elevated position to a position where it rests on the frame 10 in substantial alinement with the seat member 12.

In the form shown, the stud 20 has a threaded shank on which is mounted a nut 23 shaped to provide a knurled knob 24 as a finger hold for turning the nut to clamp the bars 17 frictionally between washers 25.

Figure 4:
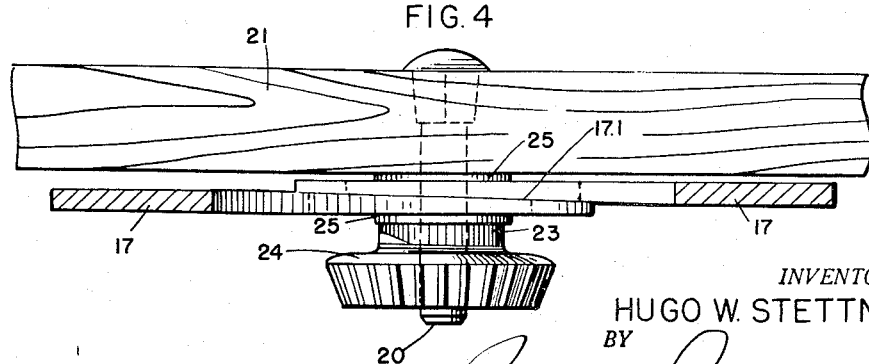
Fig. 4 is a fragmentary sectional detail of the brace clamping mechanism as viewed from the line 4—4 of Fig. 3.

The brace bars 17 are preferably flat metal strips of rectangular cross secton, and each bar is tapered in thickness in wedge form throughout the portion thereof that is to be engaged by the other bar and the clamp as illustrated at 17.1 in Fig. 4, so that once the clamp is tightened any downward pressure due to load on the head end of the back rest 13 will tighten the clamping engagement and thus effectually prevent any accidental slippage.

Figure 3:
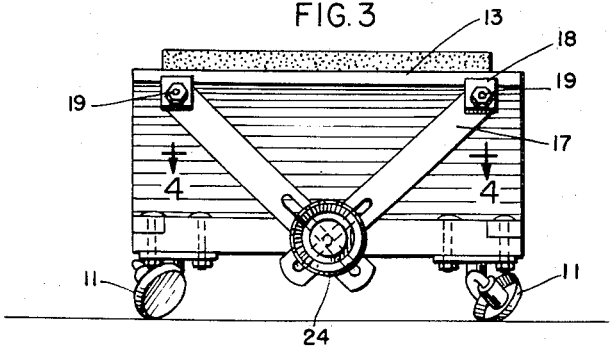
Fig. 3 is an elevation viewed from the head end of the creeper.

By the arrangement shown, the bars 17 permit a large range of angular adjustment between the back rest and the frame without interference with the floor, as will be seen from Fig. 3 and in the lowest position of the head rest these bars 17 lie substantially along the end member 21 of the frame.

Although but one specific embodiment of this invention is herein shown and described, it will be understood that numerous details of the construction shown may be altered or omitted without departing from the spirit of the invention as defined by the following claims.

I claim:

1. A floor creeper, comprising a horizontally disposed wheeled frame member, a platform thereon including a tiltable back rest member, a pair of brace bars supporting said back rest member, said brace bars being hinged in laterally spaced relation to each other on one said member and being disposed so as to cross each other adjacent the other said member and each being longitudinally slotted at such crossing, a common clamp stud on said other member extending through the slots of both said brace bars, adjustable clamp means on said stud for frictionally clamping said braces against shifting relatively to each other, and one of said brace bars being of longitudinal wedge form in the area of said crossing and adapted to tighten said clamping means when one of said members is urged toward the other.

2. A floor creeper, comprising a horizontally disposed wheeled frame member, a platform thereon including a tiltable back rest member, a pair of brace bars supporting said back rest member, said brace bars being hinged in laterally spaced relation to each other on one said member and being disposed so as to cross each other adjacent the other said member and each being longitudinally slotted at such crossing, a common clamp stud on said other member extending through the slots of both said brace bars, clamp means on said stud for frictionally clamping said braces against shifting relatively to each other, and the overlapped portions of said brace bars being of complementary longitudinal wedge formation in the area of said crossing and adapted to tighten said clamping means through a load on said back rest member.

3. A floor creeper, comprising a wheel-supported horizontal frame member, a horizontal seat thereon adjacent one end, a back rest member hinged thereon to tilt between a position of substantial alinement with said seat and a position inclined upwardly therefrom, means for holding said back rest member in various positions and comprising a stud on one said member and a pair of braces each longitudinally slotted to receive said stud and rotatable thereon, said braces being hinged to the other said member at points respectively spaced laterally from opposite sides of said stud, and adjustable means threaded on said stud for clamping said braces against relative movement, the overlapping slotted portions of said brace bars being of complementary wedge formation each increasing in thickness toward its hinged end for tightening said clamping means through mutual wedging action under load upon said back rest member.

References Cited in the file of this patent

UNITED STATES PATENTS

| | | |
|---|---|---|
| 82,800 | Christie | Oct. 6, 1868 |
| 648,026 | Hall | Apr. 24, 1900 |
| 1,104,398 | Zimmerman | July 21, 1914 |
| 2,487,706 | Happ | Nov. 8, 1949 |